(12) United States Patent
Sebastian (10) Patent No.: US 10,944,667 B2
(45) Date of Patent: Mar. 9, 2021

(54) LOOP CHECK PACKETS

(71) Applicant: Hewlett Packard Enterprise Development LP, Houston, TX (US)

(72) Inventor: Celestian K. Sebastian, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 118 days.

(21) Appl. No.: 16/113,005

(22) Filed: Aug. 27, 2018

(65) Prior Publication Data

US 2020/0067821 A1 Feb. 27, 2020

(51) Int. Cl.
*H04L 12/24* (2006.01)
*H04L 12/705* (2013.01)
*H04L 12/721* (2013.01)
*H04L 12/761* (2013.01)

(52) U.S. Cl.
CPC .............. *H04L 45/18* (2013.01); *H04L 41/12* (2013.01); *H04L 45/16* (2013.01); *H04L 45/66* (2013.01)

(58) Field of Classification Search
CPC ................................ H04L 45/18; H04L 41/12
See application file for complete search history.

(56) References Cited

U.S. PATENT DOCUMENTS

| | | | |
|---|---|---|---|
| 8,441,941 B2 | 5/2013 | McDade et al. | |
| 8,604,910 B2 | 12/2013 | Howarth | |
| 8,750,122 B1 | 6/2014 | Assarpour | |
| 9,253,073 B2 | 2/2016 | Chang | |
| 2008/0080398 A1* | 4/2008 | Yasuie | H04L 12/462 370/254 |
| 2014/0126352 A1* | 5/2014 | Tatsumi | H04L 49/25 370/220 |
| 2016/0149751 A1 | 5/2016 | Pani et al. | |

OTHER PUBLICATIONS

Ethernet Routing Switch 8600, (Research Paper), Mar. 14, 2012, 40 Pgs.

* cited by examiner

*Primary Examiner* — Angel T Brockman
(74) *Attorney, Agent, or Firm* — Brooks, Cameron & Huebsch, PLLC (57) ABSTRACT

In some examples, a network device may determine an uptime of a first port and a second port, compare the uptimes of the first and second ports to a transmit interval time, and determine that the first port is connected to the network device via a more recently configured link than the second port and is the cause of the network loop when the uptime of the first port is less than the transmit interval time. The network device may determine that the second port is connected to the network device via a less recently configured link than the first port and is not the cause of the network loop when the uptime of the second port is greater than the transmit interval time and disable the first port based on the determination that the first port is connected to the network device via the more recently configured link.

20 Claims, 5 Drawing Sheets

LOOP CHECK PACKETS

BACKGROUND

Network devices may send data between devices within a network. Data may be imbedded in packets. Packets may be populated with the data to be transmitted from one device to another device.

DETAILED DESCRIPTION

A network device may transmit information between other devices which may allow a communication between different networks and the respective network devices within those networks. The information may be data transmitted between the network devices, and the data may be imbedded in packets. An example of the type of information imbedded in the packets may include source address information (e.g., of the network device transmitting the packet), destination address information (e.g., which network device(s) may be receiving the packet), network information, time of transmission, payload, etc.

Sometimes, network bridging may be utilized to allow networks and/or network devices to communicate by sending packets from one network device to another network device. For example, a network device may be used as a bridge to send packets from a network device on a network to a different network device on a different network. Some packets may be broadcast packets that may be forwarded via links between network devices configured in the network to be received by devices that are connected to the network. As used herein, the term "configured" refers to the arrangement or order of elements for a designated task. Put another way, "configured" as used herein, can include elements of a network arranged for a specific use (e.g., adapted for a designated task). For example, a network device may be configured to utilize particular ports to transmit a broadcast packet to a different network device via configured links between the network devices. Sometimes, network loops may be inadvertently created when a network is configured. As used herein, the term "network loop" refers to a network configuration where multiple connections between two network devices and/or between multiple ports on an individual network device cause a packet (e.g., a broadcast packet) to circulate repeatedly through the configured network. For example, a broadcast packet may be transmitted from a first network device via a first link, received on a second network device, and retransmitted back to the first network device via a second link, thus indicating the presence of a network loop. In this instance, the retransmitted broadcast packet may be transmitted again to the second device, and retransmitted again to the first device, etc. thus flooding the network and disrupting traffic flow. In this way, a network loop may cause the broadcast packet transmitted by the first network device to circulate through the network repeatedly causing network disruption. Non-limiting examples of network disruption may be wasted bandwidth and overwhelming computing resources, which may potentially delay other network communications. For these and similar reasons, network loops may be avoided, and when a network loop is detected, it may be disabled.

To avoid network traffic disruption, a network device may transmit a special packet (e.g., a loop check packet) to probe for the existence of a network loop such that the network loop may be detected and disabled. For example, a network may be configured such that a first network device is connected to multiple other network devices utilizing multiple links between the first device and the multiple devices. The first network device may transmit a loop check packet to each device connected to the first network device via links between each device and the first network device. In the absence of the first network device receiving a retransmitted loop check packet from one of the multiple devices indicates that a network loop is not present in the network. However, a network loop may be inadvertently created when a new link is configured between one of the multiple devices (e.g., a second network device) and the first network device. In this instance, the first device may receive the retransmitted loop check packet via the new link, and thus be alerted that a network loop exists. The first device may take action to remove the network loop from the network to avoid further network disruption. Specifically, the first network device may process the loop check packet and disable the transmission port or the receiving port on the first device, which may disable the link corresponding to the respective port.

For example, in response to receiving a retransmitted loop check packet, the first network device may process the loop check packet and determine the transmission port based on information imbedded in the loop check packet. The first network device may determine the receipt port information by identifying the receipt port from the hardware of the first network device. The first network device may be configured to disable a particular port (e.g., receipt or transmission) in response to the determination of the presence of a network loop. For example, the first network device may be configured to disable the transmission port corresponding to the received retransmitted loop check packet when a network loop is detected. In this instance, the link corresponding to the transmission port may be disabled when the transmission port is disabled thus removing the network loop.

In some examples, the transmission port may not be the cause of the network loop, and disabling the link corresponding to the transmission port may prevent network traffic from flowing between the first network device and multiple network devices. For example, the link corresponding to the transmission port may have existed for a period of time prior to the detection of the network loop by the first device. This may indicate that the link corresponding to the transmission port and the transmission port itself may facilitate the transmission of network traffic. Further, because it existed for a period of time prior to the detection of the network loop, the link corresponding to the transmission port may be an established, valid, and in-use link. Thus, the configuration of the first network device to disable the transmission port (or the receipt port) in response to the detection of a network loop may result in network disruption.

In some examples, a network device may compare transmission port information and receipt port information to determine which port may be disabled to remove a network loop with the least amount of network disruption. A network device may probe the network with a loop check packet to detect a network loop during a transmit interval time. This probing may be controlled for a frequency, the ports on which the probe is sent (e.g., transmitted), and the local area network (LAN) on which the loop check packet is transmitted. To avoid disabling a valid and in-use link between ports which may be transmitting traffic for multiple devices, the network device may compare an uptime of the transmission port (and/or the receiving port) to the transmit interval time. As used herein, the term "uptime" refers to a measure of time that a port and/or a link has been working and available. For example, when the network device detects a network loop by receiving a retransmitted loop check packet, the network device may process the packet and compare the uptime of the transmission port to the transmit interval time. The port (transmission and/or receiving) having an uptime that is less than the transmit interval time may indicate that the port is connected to a recent link between network devices and thus, may be the cause of the network loop.

In contrast, the port having an uptime that is greater than the transmit interval time may indicate that the port is connected to a link that is older, thus, existed prior to the transmit interval time. The port having an older uptime may indicate that this link is not the cause of the network loop and should not be disabled. An older link may be used by a plurality of ports and a plurality of devices to transmit packets from one network device to another network device. As described in examples herein, when a network device receives a loop check packet (e.g., a probe packet) it may process the packet and compare the uptime of the transmission port (and/or the receipt port) to the transmit interval time prior to disabling the link from which the loop check packet was sent from and/or arrived on. In this way, the most recent network link may be disabled, which may remove the network loop without disrupting network traffic.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

Figure 1:
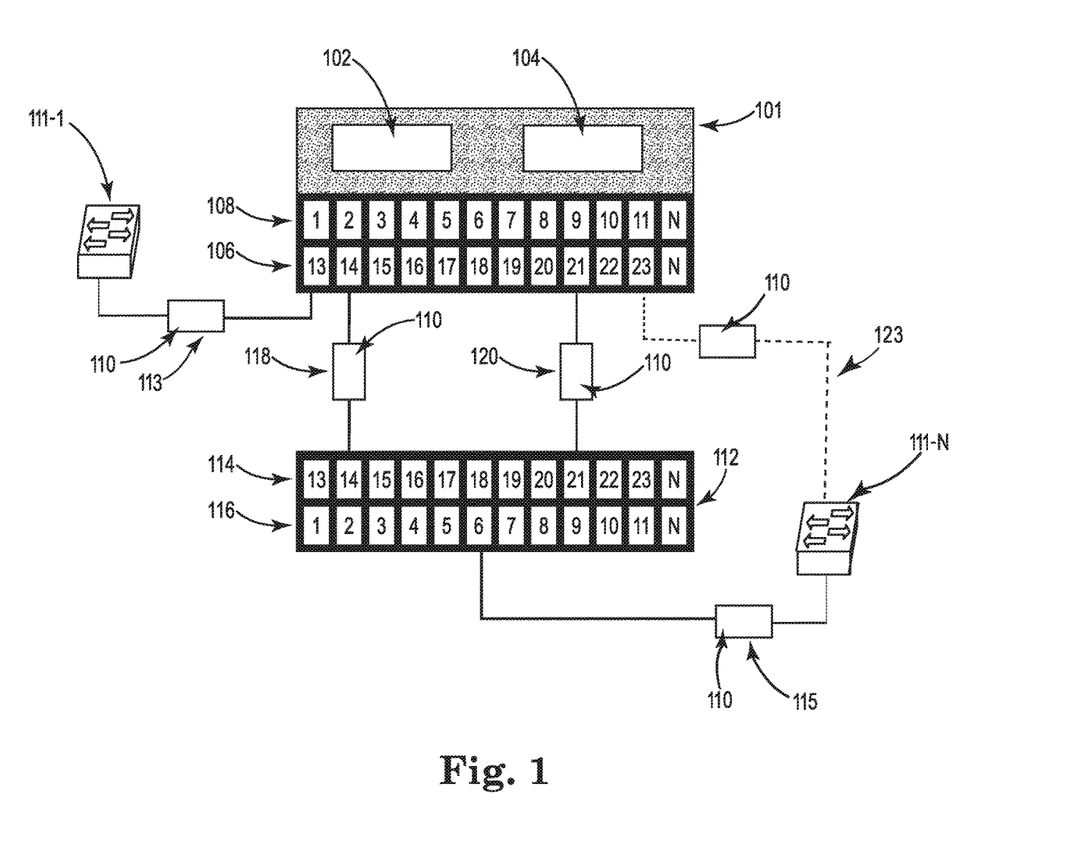
FIG. 1 illustrates an example network device consistent with the present disclosure.

FIG. 1 illustrates an example network device 101, consistent with the present disclosure. FIG. 1 illustrates two network devices, a first network device 101 (e.g., a switch), including a processing resource 102, a memory resource 104, a first plurality of ports 106-1, ..., 106-N, and a second plurality of ports 108-13, ..., 108-N. The first network device 101 may be connected to a first AP 111-1 via a link 113. As used herein, the first plurality of ports 106-1, ..., 106-N may be collectively referred to as first plurality of ports 106. Likewise, the second plurality of ports 108-13, ..., 108-N may be collectively referred to as second plurality of ports 108. Although not shown in FIG. 1 for clarity and so as not to obscure examples of the disclosure, the first network device 101 may also be connected to a management controller to execute network tasks, provide a user interface, receive information about the network including the presence of a network loop, and provide information about the presence of a network loop to a network administrator.

As illustrated in FIG. 1, a second network device 112 (e.g., a second switch) may include a third plurality of ports 114-13, ..., 114-N, and a fourth plurality of ports 116-1, ..., 116-N. The second network device 112 may be connected to a second AP 111-2 via a link 115. For clarity, and so as to not obscure the examples of the disclosure, the second network device 112 may also include a processing resource and a memory resource although not expressly illustrated by FIG. 1. As used herein, the third plurality of ports 114-13, ..., 114-N may be collectively referred to as third plurality of ports 114. Likewise, the fourth plurality of ports 116-1, ..., 116-N may be collectively referred to as fourth plurality of ports 116. Each of the plurality of ports 108, and 106 may be used to connect another network device (e.g., the first AP 111-1) to the first network device 101. Likewise, each of the plurality of ports 114, and 116 may be used to connect another network device (e.g., the second AP 111-N) to the second network device 112.

The processing resource 102 may be a central processing unit (CPU), a semiconductor-based microprocessor, and/or other hardware devices suitable for retrieval and execution of instructions stored in non-transitory computer readable medium (e.g., the memory resource 104). The processing resource 102 may fetch, decode, and execute instructions. As an alternative or in addition to retrieving and executing instructions, processing resource 102 may include an electronic circuit that includes electronic components for performing the functionality of instructions. The memory resource 104 may be electronic, magnetic, optical, or other physical storage device that stores executable instructions. Thus, memory resource 104 may be, for example, Random Access Memory (RAM), an Electrically-Erasable Programmable Read-Only Memory (EEPROM), a storage drive, an optical disc, and the like. Although the following descriptions refer to a single processing resource and a single memory resource, the descriptions may also apply to a system with multiple processing resources and multiple memory resources. In such examples, the instructions may be distributed (e.g., stored) across multiple memories and the instructions may be distributed (e.g., executed by) across multiple processing resources.

In addition to, or in place of, the execution of executable instructions, various examples of the disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), Field Programmable gate Array (FPGA), etc.), as opposed to computer executable instructions (e.g., software, firmware, etc.) stored in memory and executable by a processor.

As used herein, "network device" refers to a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. A network device may refer to a network controller that comprises a hardware or a combination of hardware and software that enables connection between client devices and computer networks. As used herein, the term "access point" (AP) may refer to receiving points for any known or convenient wireless access technology which can later become known. For example, APs function as an electronic device that is adapted to allow wireless devices to connect to a wired network via various communications standards. In some examples, a network device may refer to a server computing device (e.g., on-premise server, private, public, or hybrid cloud server) that comprises a hardware or a combination of hardware and software that can process and/or display network-related information.

As used herein, the term "switch" refers to a computer networking device that connects devices together on a network by using, for example, packet switching to receive, process and forward data to a destination device. For instance, a switch can be aware of addresses associated with each of its ports and can forward each incoming packet to a correct port. A switch can base forwarding decisions on imbedded information that is provided in the packets.

In some examples, a network may include network devices that communicate as devices within a network relationship. As used herein, the term "network relationship" can, for example, refer to a LAN, VLAN, wide area network (WAN), personal area network (PAN), a distributed computing environment (e.g., a cloud computing environment), storage area network (SAN), Metropolitan area network (MAN), a cellular communications network, and/or the Internet, among other types of network relationships.

As illustrated in FIG. 1, the first network device 101 may transmit and/or receive a loop check packet 110. Although the examples herein may refer to specifically to a loop check packet, the first network device 101 may transmit multiple types of packets, and the examples referring to a loop check packet 110 are not so limited. As used herein, the term "packet" refers to a formatted unit of information (e.g., data), where the data may include a payload consisting of the information that is expected to be delivered from one network device to other network devices. As used herein, the term "information" can, for example, refer to data, addresses, control, management (e.g., statistics) or any combination thereof, among other information.

As used herein, the term "loop check packet" refers to a special broadcast packet that may be transmitted from a network device to probe for the presence of a network loop. For example, the loop check packet 110 may be a layer 2 multicast packet that includes fields for a destination media access control (MAC) address, a source MAC address, a basic service set identifier (BSSID), and a packet payload. As used herein, the term "destination MAC address" refers an address that indicates a device or devices to which the loop check packet 110 may be transmitted. As used herein, the terms "source MAC address" and "BSSID" refer to the network device that originally transmitted the loop check packet 110. As used herein, the term "payload" may contain data to be transmitted to other devices, the payload may also be used for other purposes. In some examples, the loop check packet may be transmitted during regular transmit interval times.

For example, the first network device 101 may determine a transmit interval time indicating an amount of time when the first network device 101 transmits a loop check packet 110 from the first plurality of ports 106 to a second network device 112 to probe for a network loop. As used herein, the term "transmit interval time" refers to a period of time where a network device may transmit a loop check packet to probe for a network loop. For example, the first network device 101 may transmit the loop check packet 110 every 5 seconds to probe for a network loop, in this example the transmit interval time would be 5 seconds. Although in this example, the transmit interval time is 5 seconds, other examples, may include a period of time that is longer or shorter than 5 seconds.

In some examples, the first network device 101 may be connected to AP 111-1 via link 113 and port 106-13, and the second network device 112 may be connected to the second AP 111-N via link 115 and port 116-6. The first network device 101 is illustrated in FIG. 1 as connected to the second network device 112 and described referencing the ports 106-14, 114-14, 106-21, and 114-21 in FIG. 1, examples are not so limited and multiple ports are contemplated in the present disclosure. During a transmit interval time of 5 seconds, the first network device 101 may transmit a loop check packet 110 to a second network device 112 from a transmission port (e.g., a first port 106-14) and received by the port 114-14 of the second network device 112 via a first link 118.

The loop check packet 110 may be a broadcast loop check packet (e.g., a layer 2 multicast packet). Thus, the loop check packet 110 may be transmitted to the first AP 111-1 via link 113 and port 106-13, and to the second network device 112 via link 118 and the first port 106-14. When the loop check packet 110 is received by the second network device 112, it may be forwarded to any device connected to the second network device 112 via the third plurality of ports 114 and the fourth plurality of ports 116. For example, the second network device 112 may be connected the AP 111-N via port 106-6 of the fourth plurality of ports 116. In this example, the loop check packet 110 may be forwarded to the AP 111-N connected to the fourth plurality of ports 116. Because the second network device 112 is also connected to the first network device 101 via link 120, the loop check packet 110 will be forwarded via link 120. Specifically, the loop check packet 110 may be retransmitted via port 114-21 of the second network device 112 to a receipt port (e.g., a second port 106-21) of the first network device 101 via a second link 120.

As used herein, the term "retransmitted" refers to a packet (e.g., a loop check packet 110) is transmitted for a second or more instance. For example, receiving the retransmitted loop check packet 110 by the first network device 101 may indicate the existence of a network loop because the first network device 101 has received the loop check packet 110 on an interface that is different from the interface that initially transmitted the loop check packet 110. Said differently, the first network device 101 receiving the retransmitted loop check packet 110 via the second link 120 indicates that network traffic is circulating repeatedly through the configured network and may cause network disruption. In some examples, the first network device 101 may act to remove the network loop by determining an uptime of the receipt and transmission port of the first plurality of ports 106 associated with the retransmitted loop check packet 110 to determine the cause of the network loop.

As mentioned, the first network device 101 may receive a retransmitted loop check packet 110 on a second port 106-21 of the first network device 101, thus indicating the presence of a network loop. The first network device 101 may determine an uptime of the first port 106-14 and an uptime of the second port 106-21 of the first plurality of ports 106, where an uptime of each of the first plurality of ports 106 indicates an amount of time that a particular port has been operating to transmit and receive the loop check packet 110. For example, in response to determining the presence of a network loop, the first network device 101 may process the retransmitted loop check packet 110 to determine the amount of time in which the first port 106-14 (e.g., the transmission port) has been operational in comparison to the second port 106-21 (e.g., the receipt port). The determined uptime of the first port 106-14 and the second port 106-21 may be compared to determine the cause of the network loop by determining the more recently configured link.

As used herein, the term "more recently configured" refers to a link that has been established subsequent to a different link when the port uptime corresponding to each link are compared. In some examples, the more recently configured link may be determined by comparing the uptimes of the respective ports to a transmit interval time, where the port with an uptime of less than the transmit interval time may be the more recently configured link when compared to a port having an uptime greater than the transmit interval time (e.g., a less recently configured link). In yet other examples, the port uptime corresponding to a first and a second link may be compared to one another, with the port having the shorter uptime corresponding to the more recently configured link. A more recently configured link may indicate that the link may not be utilized by other network devices and may not maintain network communication since the link is more recently configured. In other words, because the more recently configured link has been operational for a shorter amount of time compared to a preexisting link, the more recently configured link may be utilized more sparingly compared to a preexisting link. Additionally, a more recently configured link may indicate that the recent configuration is the cause of the network loop and thus may be disabled from operation.

As used herein, the term "less recently configured link" refers to a link that has been established prior to a different link when the port uptime corresponding to each link are compared. In some examples, the less recently configured link may be determined by comparing the uptimes of the respective ports to a transmit interval time, where the port with an uptime of more than the transmit interval time may correspond to the less recently configured link when compared to a port having an uptime less than the transmit interval time (e.g., a more recently configured link). In yet other examples, the port uptimes corresponding to a first and a second link may be compared to one another, with the port having the longer uptime corresponds to the less recently configured link. A less recently configured link may indicate that the link is utilized by several network device to transmit network packets and is utilized to maintain network communication. In other words, because the less recently configured link has been operational for a longer amount of time compared to a recently configured link, the less recently configured link may be heavily utilized when compared to a recently configured link. Additionally, a less recently configured link may indicate that the configuration is the not the cause of the network loop as the less recently configured link was established prior to the transmit interval time and/or a more recently configured link.

For example, the first network device 101 may compare the uptime of the first port 106-14 and the second port 106-21 to the transmit interval time and determine that the first port 106-14 is connected to the first network device 101 via a more recently configured first link 118 than the second port 106-21 and is the cause of the network loop when the uptime of the first port 106-14 is less than the transmit interval time. Specifically, if the transmit interval time is 5 seconds, and a retransmitted loop check packet 110 is received on the second port 106-21 thus indicating a network loop, the first network device 101 may process the loop check packet 110 and determine the uptime of the first port 106-14 to be 3 seconds. Further, the first network device 101 may determine that the second port 106-21 is connected to the first network device 101 via a less recently configured link 120 than the first port 106-14 and is not the cause of the network loop when the uptime of the second port 106-21 is greater than the transmit interval time. Specifically, if the transmit interval time is 5 seconds, and the uptime of the second port 106-21 is 10 seconds, the second link 120 is a less recently configured link and is likely not the cause of the network loop because it existed prior to the transmit interval time of the loop check packet 110. Thus, the second link 120 existed prior to the loop check packet 110 having been transmitted from the first port 106-14 and is not the cause of the network loop. Based on the comparison of port uptimes to the transmit interval time, the first network device 101 may disable the more recently configured first link 118 to remove the network loop.

For example, the first network device 101 may disable the first port 106-14 based on the determination that the first port 106-14 is connected to the first network device 101 via the more recently configured first link 118, where disabling the first port 106-14 removes the network loop. Said differently, in response to the first network device 101 determining that the more recently configured first link 118 is the cause of the network loop, the first network device 101 may disable the first link 118 by disabling the first port 106-14. In this way, the network loop is removed from the configured network and network traffic will not circulate repeatedly through the network. By removing the more recently configured first link 118 the network loop may be disabled without disrupting network traffic. To protect the network from another network loop being inadvertently created when the network is configured, the first network device 101 may transmit a signal to warn a management controller of the determined existence of the network loop, based on the first port 106-14 having been disabled. In this way, a network administrator may be alerted that there was a network loop and may take actions to prevent network disruption.

In some examples, the first plurality of ports 106 and the second plurality of ports 108 of the first network device 101 continue to transmit network packets to the second network device 112 after the first port 106-14 and the first link 118 has been disabled. For example, the first network device 101 may disable the first port 106-14 to remove the network loop, thus disabling the first link 118. Regardless of the first link 118 having been disabled, the first network device 101 may continue to operate to transmit and receive network packets and may continue to transmit loop check packets 110 to probe for other network loops. For example, the first network device 101 may continually transmit the loop check packet 110 to the first AP 111-1, the second network device 112, and the second AP 111-N (via the second network device 112) during the transmit interval time. In this way, the first network device 101 may probe for new network loops after a network loop has been detected and removed from the network configuration. In some examples, the first network device 101 may receive another retransmitted loop check packet 110 during the transmit interval time thus indicating a second network loop.

As mentioned herein, the first network device 101 transmit the loop check packet 110 to the second AP 111-N via the second network device 111-N. The following example describes a new link 123 between the first network device 101 and the second AP 111-N. For example, a second loop check packet 110 may be transmitted by the second port 106-21 and retransmitted by the second network device 112 to be received by the second AP 111-N via the link 115 and retransmitted via the new link 123 and received back on the first network device 101 at a third port 106-23, thus indicating a second network loop. In some examples, a network loop may be inadvertently created while configuring and/or reconfiguring a network. For example, the new link 123 between the first network device 101 and the second AP 111-N may have been created when the network is configured, and the second network loop may have been inadvertently created as a result. The first network device 101 may process the loop check packet 110 received via the new link 123 to determine the cause of the second network loop. The first network device 101 may determine an uptime of the third port 106-23 (e.g., the receipt port) of the first plurality of ports 106 and compare the uptime of the second port 106-21 (e.g., the transmission port) and the uptime of the third port 106-23 to the transmit interval time. Specifically, if the transmit interval time is 5 seconds, the first network device 101 may determine the uptime of the third port 106-23 is 3 seconds and the uptime of the second port 106-21 is 10 seconds. In this example, the first network device 101 may disable the third port 106-23 of the first plurality of ports 106 based on the determination that the uptime of the third port 106-23 is less than the transmit interval time, where disabling the third port 106-23 disables the new link 123 and removes the second network loop.

Based on the comparison of the uptimes of the second port 106-21 and the third port 106-23 to the transmit interval time, the first network device 101 may determine that the new link 123 corresponding to the third port 106-23 is a more recently configured link and is the cause of the second network loop. In this way, the first network device 101 may remove the second network loop while avoiding network disruption that may be caused by disabling a less recently configured second link 120 corresponding to the second port 106-21. Said differently, because the less recently configured second link 120 was established prior to the new link 123, it may serve as a link for additional network traffic. In other examples, the first network device 101 may detect a network loop where the transmission and receiving ports associated with the retransmitted loop check packet 110 both have an uptime that is longer than the transmit interval time.

For example, the first network device 101 may transmit a loop check packet 110 from the first port 106-14 to the second network device 112 via a first link 118 during a transmit interval time of 5 seconds. In response to receiving the loop check packet 110, the second network device 112 may forward the loop check packet 110 to other network devices connected to the second network device 112. In this instance, assume that the second network device 112 has one other device connected, the first network device 101. The first network device 101 may receive the retransmitted loop check packet 110 on the second port 106-21 via a second link 120, thus indicating the presence of a network loop because the first network device 101 received the loop check packet 110 on a different interface than it was transmitted. This may indicate that network traffic is circulating repeatedly through the network, wasting bandwidth and network resources. The first network device 101 may take action to remove the network loop by determining the more recently configured link by comparing the port uptimes corresponding to the first link 118 and the second link 120.

For example, upon the receipt of a retransmitted loop check packet 110 at the second port 106-21, the first network device 101 may determine the port uptime of the second port 106-21 is an amount of time that is greater than the transmit interval time of 5 seconds. Further, the first network device 101 may determine the port uptime of the first port 106-14 is also an amount of time that is greater than the transmit interval time of 5 seconds. Specifically, the first network device 101 may determine that the port uptime of the first port 106-14 is 8 seconds, and the port uptime of the second port 106-21 is 10 seconds. In this example, both the first port 106-14 (e.g., the transmission port) and the second port 106-21 (e.g., the receiving port) have uptimes that are longer than the transmit interval time, and the first network device 101 may compare the port uptimes to one another to determine the more recently configured link. Specifically, the first network device 101 may compare the port uptime of the first port 106-14 to the port uptime of the second port 106-21 and determine that the first port 106-14 has an uptime that is shorter than the uptime of the second port 106-21. The first port 106-14 having a shorter uptime may indicate that the first link 118 is more recently configured and may be the cause of the network loop. The first network device 101 may disable the first port 106-14 having the shorter port uptime, based on the comparison of the second port uptime 106-21 to the first port uptime 106-14. In this way, the network device may remove a network loop and avoid network traffic disruption that may be associated with disabling the less recently configured second link 120.

While the non-limiting examples described above in connection with FIG. 1 describe a loop check packet 110 being transmitted from the first network device 101 to the second network device 112 via a first link 118, and the loop check packet 110 retransmitted from the second network device 112 to the first network device 101 via the second link 120, in some examples, a loop check packet 110 may be transmitted in the reverse direction.

FIG. 1 illustrates a network relationship between a first network device 101 and a second network device 112. When a retransmitted loop check packet 110 is received by the first network device 101 it may be indicative of the existence of a network loop. The first network device 101 may process the packet and compare the uptime of the transmission and receiving ports to a transmit interval time and disable the port with an uptime less than that of the transmit interval time. The more recent connection (e.g., the more recently configured link) may indicate that it was the cause of the network loop, because the port with the older uptime (e.g., the less recently configured link), when compared to the transmit interval time, was operating before the network loop was detected. By processing the packet and comparing the uptimes of the respective ports to the transmit interval time, a network loop may be removed by the first network device 101 with less network disruption as compared to disabling an established link that may have a high traffic throughput.

Figure 2:
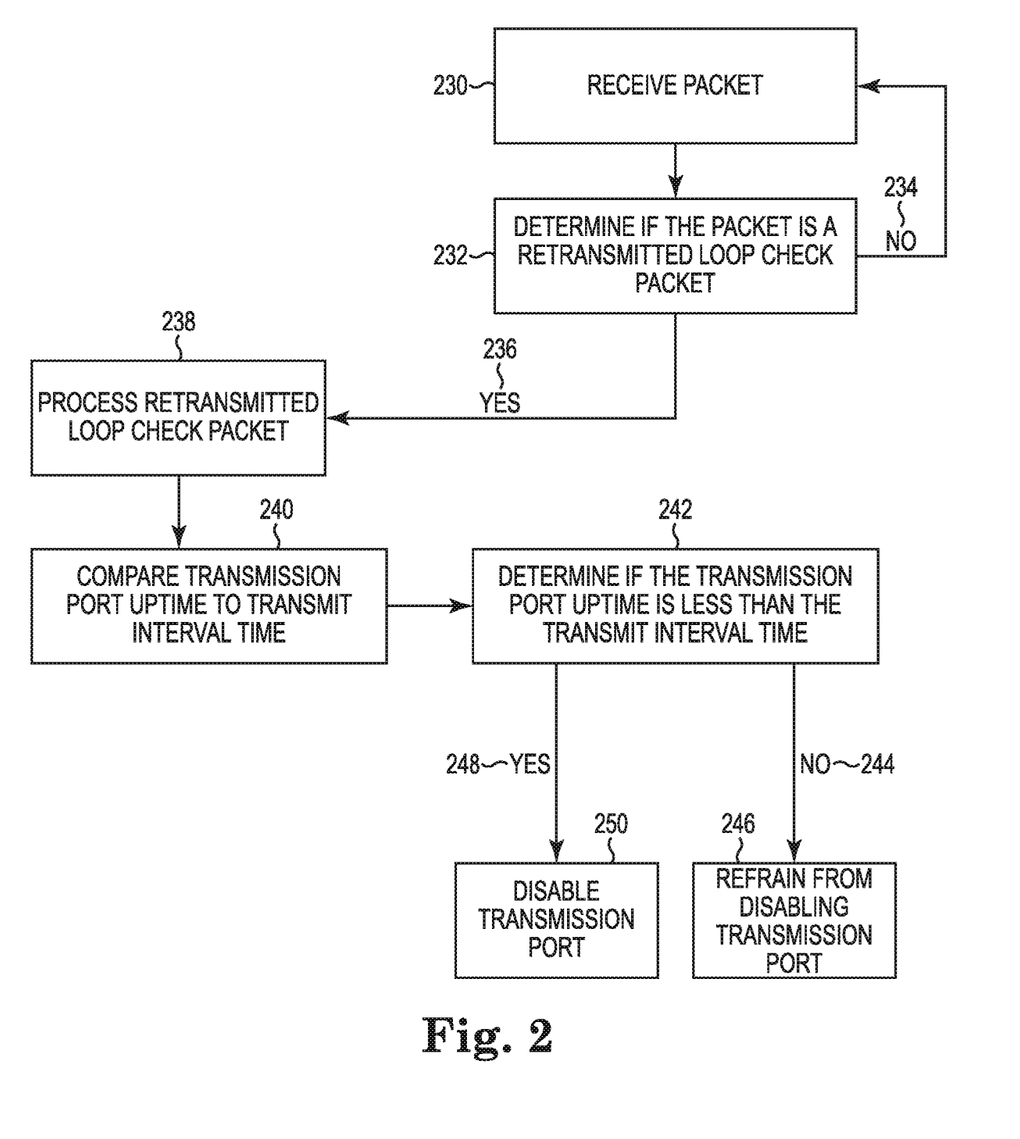
FIG. 2 illustrates an example flow diagram consistent with the present disclosure.

FIG. 2 illustrates an example flow diagram consistent with the present disclosure. As shown in FIG. 2, at block 230, a first network device (e.g., the first network device 101) may receive a packet from a second network device (e.g., the second network device 112). At block 232, the first network device may determine if the received packet is a retransmitted loop check packet (e.g., loop check packet 110); if the first network device determines the packet is not a loop check packet ("no" at block 234), the packet may be processed as a network packet and the process may start over at block 230. In contrast, if the packet is determined, at block 232, to be a retransmitted loop check packet ("yes" at 236) and indicate that a network loop has been configured into the network. The first network device receiving a retransmitted loop check packet indicates that network traffic may be repeatedly circulating the network which may cause network disruption, waste bandwidth, and other network resources. Network loops may be inadvertently created when networks are configured, and the first network device may take action to remove the network loop to avoid further network disruption by processing the retransmitted loop check packet at block 238.

The first network device may process the retransmitted loop check packet to determine information related to determine the transmission/receiving ports and the corresponding links that may have transmitted the loop check packet through the network. The first network device may also determine the transmit interval time during which the loop check packet was transmitted to probe for network loops. For example, the first network device may check for information relating to the transmission port (e.g., first port 106-14) where the loop check packet was initially transmitted. The first network device may also determine the receiving port (e.g., second port 106-21) where the retransmitted loop check packet was received on the first network device from the second network device. The transmission port information is identified by processing the retransmitted loop check packet and the receiving port information may be derived from the hardware of the first network device. The first network device may take action to disable the transmission/receipt port to disable the link that is the cause of the network loop, based on the information indicated from processing the loop check packet. In some examples, the first network device may determine the port uptime of the receipt port and the transmission port so that it may compare the respective port uptimes to the transmit interval time to determine the cause of the network loop.

For example, at block 240, the first network device may compare the receipt port uptime to the transmit interval time to determine an amount of time that the receipt port has been operating within the network. The first network device may compare the receipt port uptime to the transmit interval time to determine if the receipt port was recently configured to be operational. For example, the first network device may transmit a loop check packet during a transmit interval time of 5 seconds and when the first network device receives a retransmitted loop check packet, the network device may process the retransmitted loop check packet and determine the receipt port uptime. In this way, the first network device may compare the receipt port uptime to the transmit interval time of 5 seconds. A receipt port uptime of more than the transmit interval time may indicate a less recently configured link and indicate that the link corresponding to the receipt port may not be the cause of the network loop because it was established prior to the transmission of the loop check packet. In contrast, a receipt port uptime less than the transmit interval time and/or less than the transmission port uptime may indicate a more recently configured link and may be the cause of the network loop. The process described in the previous example referring to a receipt port may be similar for the transmission port.

At block 242, the first network device may determine if the receipt port uptime is less than the transmit interval time of 5 seconds and/or less than the uptime of the transmission port. If the receipt port uptime is greater than 5 seconds ("no" at block 244), this may be indicative of the receipt port having been operational prior to the transmission of the loop check packet and detection of the network loop (e.g., the receipt of the retransmitted loop check packet described at block 232) and may not be the cause of the network loop.

Further, the receipt port having an uptime longer than the transmit interval time may indicate that the link connected to the receipt port (e.g., the second link 120) may be utilized by other network devices and have a high traffic throughput. For these reasons, the first network device may refrain from disabling the receipt port as described at block 246.

In contrast, at block 242, the first network device may determine that the receipt port uptime is less than the transmit interval time ("yes" at block 248). In this instance, the receipt port having an uptime that is less than the transmit interval time of 5 seconds may indicate that the link connected to the receipt port is a recent configuration. For example, the first network device can transmit a loop check packet every 5 seconds (the transmit interval time), and when the first network device receives the retransmitted loop check packet from a second device at the receipt port, the first network device may process the retransmitted loop check packet. The first network device may determine the receipt port has an uptime of less than 5 seconds, which may be an indication that the network loop was caused by a recently configured link corresponding to the receipt port. In this instance, the recently configured link may also indicate that the link is not heavily trafficked because it has been operational for a short amount of time. For these reasons, the first network device may disable the receipt port as described at block 250 to avoid further network disruption and remove the network loop.

At 240, FIG. 2 illustrates a comparison of the port uptime to the transmit interval time. For example, utilizing this comparison, the network device may selectively disable a port to remove a network loop, without interrupting other network operations. While the previous examples described in connection with FIG. 2 described a single loop check packet, a receipt port, and a transmit interval time of 5 seconds, the same descriptions may apply to multiple loop check packets, and different transmit interval times and a variety of ports (e.g., transmission ports and/or receipt ports).

Figure 3:
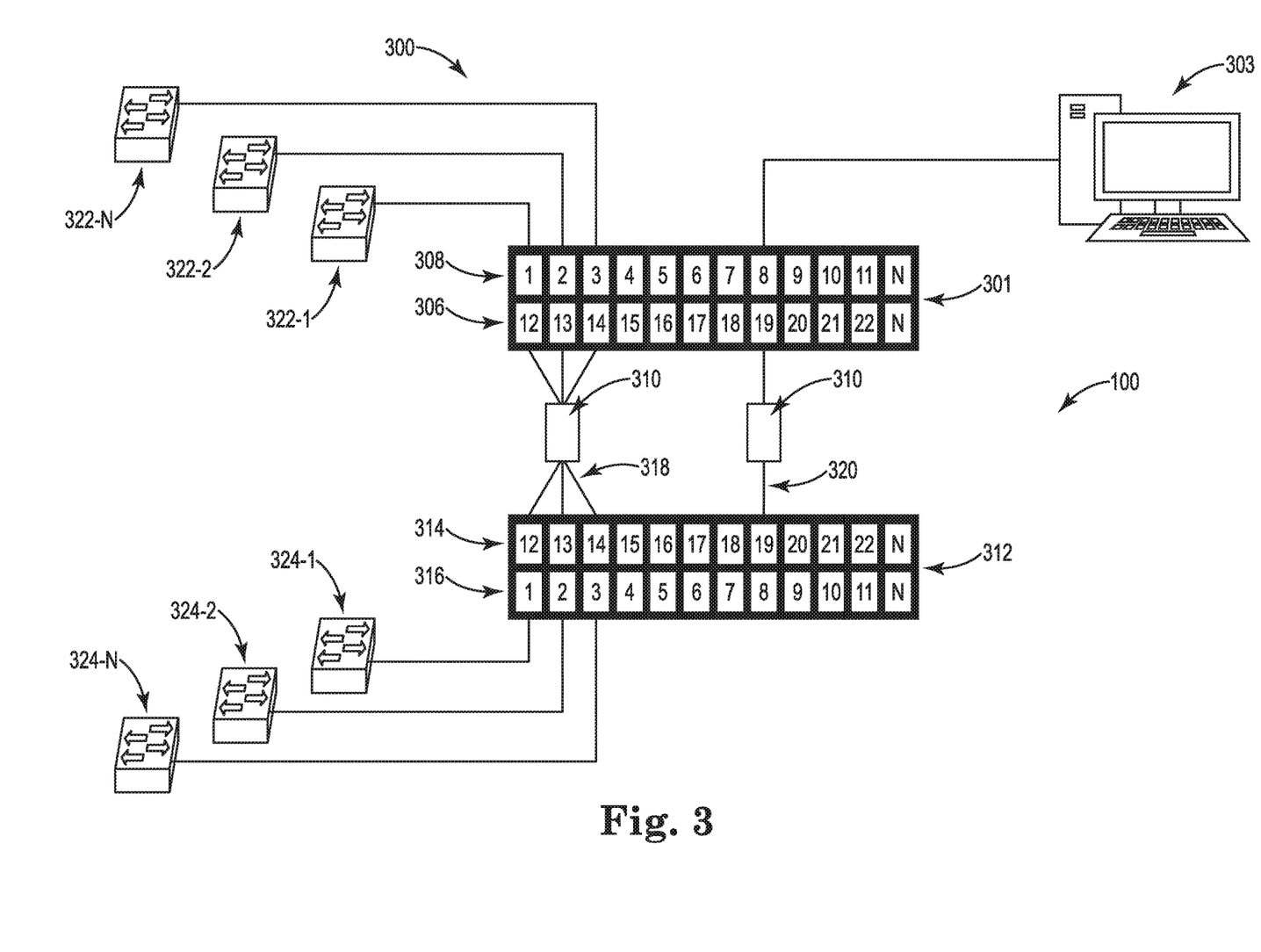
FIG. 3 illustrates an example loop detection system consistent with the present disclosure.

FIG. 3 illustrates an example loop detection system 300 consistent with the present disclosure. As illustrated in FIG. 3, the system 300 may include a first switch 301 including a first plurality of ports 306 and a second plurality of ports 308. Although not shown in FIG. 3 for clarity and so as not to obscure examples of the disclosure, the first switch 301 may also include a processing resource (e.g., the processing resource 102) and a memory resource (e.g., the memory resource 104). Further, although not shown in FIG. 3 for clarity and so as not to obscure examples of the disclosure, the first switch 301 may be connected to a management controller to execute network tasks and receive information about the network including the presence of a network loop.

The system 300 may further include a second switch 312 including a third plurality of ports 314 and a fourth plurality of ports 316. The system 300 may include a first plurality of devices 322-1, . . . , 322-N communicatively connected to the first switch 301 via respective ports of the second plurality ports 308, the first plurality of devices 322-1, . . . , 322-N may be collectively referred to as first plurality of devices 322. Likewise, the system 300 may include a second plurality of devices 324-1, . . . , 324-N communicatively connected to the second switch 301 via the respective ports of the fourth plurality ports 316, the second plurality of devices 324-1, . . . , 324-N may be collectively referred to as second plurality of devices 324.

As used herein, the term "device" may refer to another network device that may be communicatively connected to the first switch 301 and/or the second switch 312. In some examples, the first plurality of devices 322 may be network devices such as access points, computing devices, and the like which may be included in a network relationship as illustrated in FIG. 3. For example, devices 322-1, 322-2 and 322-N may each transmit packets to the first switch 301 and be received on ports 308-1, 308-2, 308-3 respectively; the packet may be transmitted by the first switch 301 via port 306-12, 306-13, and 306-14 via a Link Aggregation Group (LAG) 318 (e.g., a first link), to be received by the second switch 312 on the respective third plurality of ports 314. Additionally, the second switch 312 may process the packets from the first plurality of devices 322 and forward the packets to respective devices (e.g., the second plurality of devices 324).

As used herein, the term "Link Aggregation Group (LAG)" may refer to a link that combines multiple network connections in parallel to increase throughput beyond what an individual connection could sustain, in this way the LAG combines a number of ports together to make a single high bandwidth data path. For example, the ports 306-12, 306-13, and 306-14 may collectively transmit and receive packets via the LAG 318. Likewise, the ports 314-12, 314-13, and 314-14 may transmit and receive packets via the LAG 318. In the instance that a network device disables a port included by a LAG, the respective LAG would be disabled from transmitting network traffic for the other ports included in the LAG.

For example, the first switch 301 may transmit a loop check packet 310 during a transmit interval time of 5 seconds, where the transmit interval time indicates an amount of time when the first switch transmits the loop check packet 310 from a first port (e.g., 306-14) to a second switch 312 via a first link 318 to probe for a network loop. In this example, the loop check packet 310 may be a layer 2 multicast packet, so when the first switch 301 transmits the loop check packet 310 it may be transmitted via ports that are connecting the first switch 301 to another device. For example, the first switch 301 may transmit the loop check packet 310 during a 5 second transmit interval time, the loop check packet 310 would be forwarded to the plurality of devices 322, and to the second switch 312 from ports 306-12, 306-13, 306-14 via the LAG 318. The second switch 312 may receive the loop check packet 310 on ports connected to the LAG 318 (e.g., 314-12, 314-13, and 314-14), the second switch 312 may forward the loop check packet 310 via ports that are connected to the second switch 312 (e.g., to the second plurality of device 324). In some examples, the loop check packet 310 may be retransmitted from the second switch 312 to the first switch 301 via a port 314-19 of the third plurality of ports 314.

For example, the second switch 312 may retransmit the loop check packet 310 to the first switch 301 via a second link 320 between the second switch 312 and a second port 306-19 of the first switch 301. In response to receiving the retransmitted loop check packet 310, the first switch 301 may detect that a network loop exists based on receiving the retransmitted loop check packet 310 because the first switch 301 has received the loop check packet 310 on an interface that is different from the interface that initially transmitted the loop check packet 310. Said differently, the first switch 301 receiving the retransmitted loop check packet 310 via the second link 320 indicates that network traffic is circulating repeatedly through the network illustrated by system 300 and may cause network disruption. In some examples, the first switch 301 may act to remove the network loop by determining an uptime of the receipt and transmission port of the first plurality of ports 106 associated with the retransmitted loop check packet 310 to determine the cause of the network loop.

For example, the first switch 301 may process the retransmitted loop check packet 310 and determine the transmission port of the retransmitted loop check packet 310 is the first port 306-14. The first switch 301 may further determine the receipt port is the second port 301-19 from the hardware information included on the first switch 301 and compare an uptime of the first port 306-14 and the second port 306-19 to the transmit interval time of 5 seconds. Based on the comparison, the first switch 301 may determine that the first port 306-14 is connected to the first switch 301 via a less recently configured link than the second port 301-19 and is not the cause of the network loop when the uptime of the first port 306-14 is greater than the transmit interval time of 5 seconds. Further, because the loop check packet 310 was originally transmitted by the first switch 301 via the LAG 318, the first switch 301 may compare the uptime of the ports (e.g., port 306-14) to the transmit interval time of 5 seconds and determine that the LAG 318 and the corresponding ports utilizing the LAG 318 existed prior to the transmit interval time and may not be the cause of the network loop.

Based on the comparison of the uptime of second port 301-19 to the transmit interval time, the first switch 301 may determine that the second port 301-19 is connected to the first switch 301 via a more recently configured link (e.g., the second link 320) than the first port 306-14 and is the cause of the network loop when the uptime of the second port 301-19 is less than the transmit interval time. For example, the first switch 301 may process the retransmitted loop check packet 310 and determine that the receipt port 306-19 has an uptime of 3 seconds. Thus, the second link 320 was recently established based on the uptime of the second port 306-19 having an uptime that was less than the transmit interval time. Accordingly, the first switch 301 may disable the second port 306-19 based on the determination that the second port 306-19 is connected to the first switch 301 via the more recently configured second link 320, where disabling the second port 306-19 disables the second link 320 and removes the network loop. In this way, the network loop is removed from the configured network and network traffic will not circulate repeatedly through the network. Further, in this way, the first switch 301 may avoid disabling the LAG 318 and disrupting the high bandwidth network traffic. For example, the first plurality of network devices 322 connected to the first switch 301 by respective second plurality of ports 308 may utilize the LAG 318 to transmit network packets (e.g., network traffic) to a second plurality of devices 324 connected to respective ports of the fourth plurality of ports 316 included on the second switch 312. In this way, the LAG 318 may continue to operate after the second link 320 is disabled. In some examples, the first switch 301 may receive a retransmitted loop check packet 310 where both the transmission port uptime and the receipt port uptime are longer than the transmit interval time.

For example, the first switch 301 may send a loop check packet 310 via the LAG 318 during a first transmit interval time of 5 seconds, the loop check packet 310 may be received and forwarded by the second switch 312 while the first transmit interval time of 5 seconds elapses. Continuing with this example, the second switch 312 may retransmit the loop check packet 310 to the first switch 301 via the second link 320, where the first switch 301 may detect the presence of a network loop and process the retransmitted loop check packet 310 to compare the transmit port uptime 306-14, and the receipt port uptime 306-19, to the first transmit interval time of 5 seconds. However, because the first transmit interval time of 5 seconds has elapsed, the first switch 301 may process the retransmitted loop check packet 310 during a second transmit interval time of 5 seconds. In this example, to remove the network loop, the first switch 301 may still disable whichever port has a more recent uptime by comparing the uptime of the receipt port 306-19 associated with the second link 320 to the uptime of the transmission port 306-14 associated with the LAG 318. In this way, the network loop is removed by selectively determining which port has a more recent uptime and disabling that port, thus removing the network loop. While the previous examples describe a loop check packet 310 being originally transmitted from the first switch 301 via the LAG 318 and received by the first switch 301 via the second link 320, the same process may occur in the reverse direction.

System 300, in some examples, can detect a network loop and determine the more recent link established in the network relationship. By comparing the port uptimes of the transmission port and/or the receipt port to either the transmission interval time or the transmission/receipt port uptime, the first switch 301 may selectively disable the port having the more recent uptime whereby disabling the link most likely causing the network loop. In this way, the first switch 301 may eliminate the network loop while limiting the disruption to traffic flowing through high bandwidth links (e.g., the LAG 318).

Figure 4:
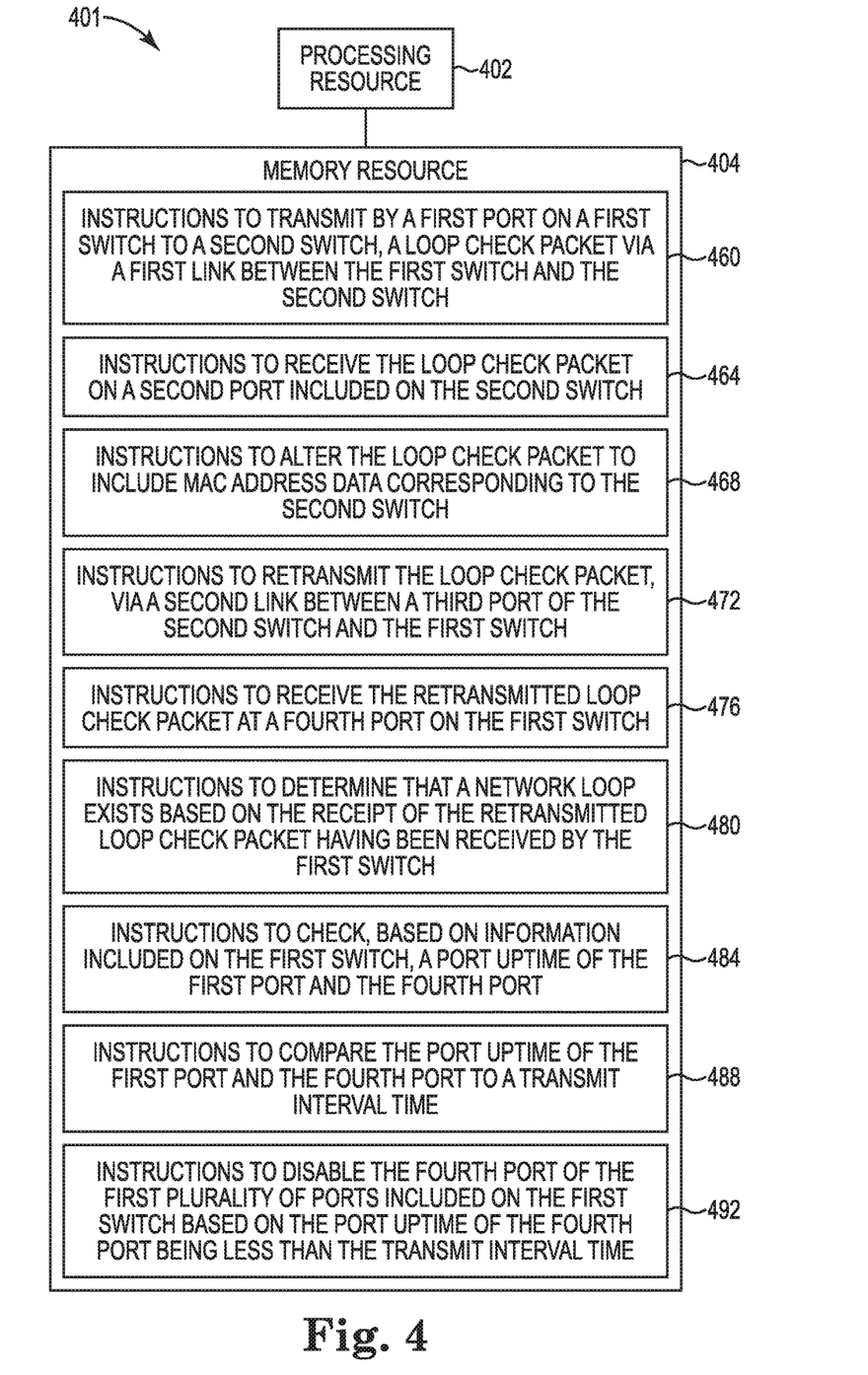
FIG. 4 illustrates an example processing resource and an example memory resource of an example network device consistent with the present disclosure.

FIG. 4 illustrates an example processing resource 402 and an example memory resource 404 of an example switch 401 consistent with the present disclosure. As illustrated in FIG. 4, the switch 401 (e.g., the first switch 301) includes a processing resource 402 and a memory resource 404. The processing resource 402 may be a hardware processing unit such as a microprocessor, microcontroller, application specific instruction set processor, coprocessor, network processor, or similar hardware circuitry that may cause machine-readable instructions to be executed. In some examples, the processing resource 402 may be a plurality of hardware processing units that may cause machine-readable instructions to be executed. The processing resource 402 may include central processing units (CPUs) among other types of processing units. The memory resource 402 may be any type of volatile or non-volatile memory or storage, such as RAM, flash memory, ROM, storage volumes, a hard disk, or a combination thereof.

The memory resource 404 may store instructions thereon, such as instructions 460, 464, 468, 472, 476, 480, and 482. When executed by the processing resource 402, the instructions 460, 464, 468, 472, 476, 480, and 482 may cause the switch 401 to perform specific tasks and/or functions. For example, the memory resource 404 may store instructions 460 which may be executed by the processing resource 402 to cause the switch 401 to determine a transmit interval time indicating an amount of time when a switch transmits a loop check packet (e.g., the loop check packet 310) from a first plurality of ports (e.g., first plurality of ports 306) to a second plurality of ports (e.g., the third plurality of ports 314 of the second switch 312) to probe for a network loop. In some examples, the switch 401 may transmit the loop check packet during a transmit interval time of 5 seconds. For example, the switch 401 may transmit a loop check packet to the ports that are also connected to other network devices every 5 seconds.

The memory resource 404 may store instructions 464 which may be executed by the processing resource 402 to cause the switch 401 to determine that a network loop exists based on the switch 401 receiving the retransmitted loop check packet because switch 401 has received the loop check packet on an interface that is different from the interface that initially transmitted the loop check packet. Said differently, switch 401 receiving the retransmitted loop check packet via indicates that network traffic is circulating repeatedly through the configured network and may cause network disruption. For example, the switch 401 may transmit a loop check packet from a transmission port (e.g., the first port 306-14) and receive the retransmitted loop check packet on a receipt port (e.g., the second port 306-19). In some examples, the switch 401 may alert a management controller to the presence of the network loop in response to the switch 401 receiving a retransmitted loop check packet.

The memory resource 404 may store instructions 468 which may be executed by the processing resource 402 to cause the switch 401 to determine an uptime of a receipt port and a transmission port included on the switch 401, where an uptime of each of the first plurality of ports indicates an amount of time that a particular port has been operating to transmit and receive the loop check packet. For example, the switch 401 may process the retransmitted loop check packet and determine the uptime of the respective ports involved with transmitting and receiving the loop check packet. In this way, the switch 401 may compare the transmission and receipt port uptime to a transmit interval time to determine the more recently configured link.

The memory resource 404 may store instructions 472 which may be executed by the processing resource 402 to cause the switch 401 to compare the uptime of the receipt port and the transmission port to the transmit interval time. The comparison of the receipt port and the transmission port to the transmit interval time may indicate an amount of traffic that is utilized by the links corresponding to the transmission port and the receipt port. For example, a particular port having an uptime that is longer than the transmit interval time and/or longer than when compared to a different port may indicate that the particular port corresponds to a link that was established prior to the loop check packet transmission or has been operating for an amount of time before a network loop was detected. Thus, the previously established link may be utilized by network devices within the network to transmit and receive network traffic.

The memory resource 404 may store instructions 476 which may be executed by the processing resource 402 to cause the switch 401 to determine that the receipt port is connected to the switch 401 via a more recently configured link than the transmission port and is the cause of the network loop when the uptime of the receipt port is less than the transmit interval time. A more recently configured link may be indicated as the cause of the network loop because it was not established prior to the switch 401 transmitting the loop check packet. Additionally, a more recently configured link may not be used by other devices to transmit network traffic because the link is a recent connection within the network, it may not be heavily utilized by other network devices.

The memory resource 404 may store instructions 480 which may be executed by the processing resource 402 to cause the switch 401 to determine that the transmission port is connected to the switch 401 via a less recently configured link than the receipt port and is not the cause of the network loop when the uptime of the transmission port is greater than the transmit interval time. For example, the processing resource may be further to check, based on information included on the switch 401, the port uptime of the transmission port of the switch 401; and compare the port uptime of the transmission port to the transmit interval time and refrain from disabling the transmission port when the uptime of the transmission port is greater than the transmit interval time. This may indicate that the link corresponding to the transmission port was less recently configured. Further, the less recently established link corresponding to the transmission port may be a LAG (e.g., the LAG 318), where a first link between the first plurality of ports included on the switch 401 and the third plurality of ports included on a different switch (e.g., the second switch 312) connects multiple devices utilizing the LAG link, and where the LAG link continues to operate responsive to the receipt port having been disabled. In this way, the switch 401 may eliminate the network loop while limiting the disruption to traffic flowing through high bandwidth, and established links.

The memory resource 404 may store instructions 482 which may be executed by the processing resource 402 to cause the switch 401 to disable the receipt port based on the determination that the receipt port is connected to the switch 401 via the more recently configured link, where disabling the receipt port removes the network loop, and where a second link between the second plurality of ports and the receipt port is disabled when the receipt port is disabled. In this way, the network loop is removed from the configured network and network traffic will not circulate repeatedly wasting bandwidth and causing network disruption. In this way, removing the more recently configured first link corresponding to the receipt port, the network loop may be disabled without disrupting network traffic. In some examples, both the transmission port and the receipt port may have port uptimes that are longer than the transmit interval time.

Figure 5:
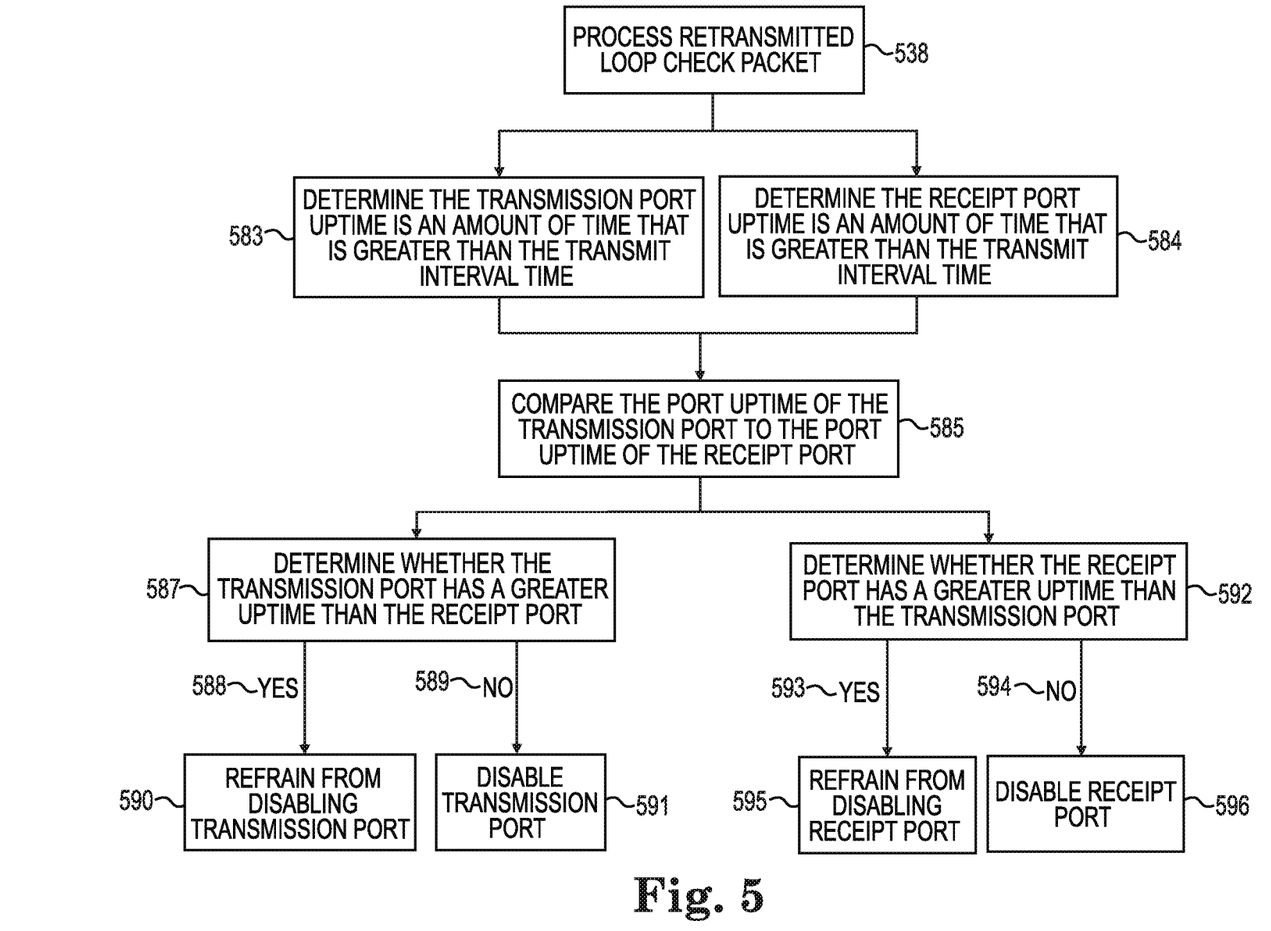
FIG. 5 illustrates an example flow diagram consistent with the present disclosure.

FIG. 5 illustrates an example flow diagram consistent with the present disclosure. A network device (e.g., the first network device 101) may receive a retransmitted loop check packet (e.g., the loop check packet 110) and determine the presence of a network loop. At block 538 the network device may process the retransmitted loop check packet to determine the uptime of the transmission port (e.g., port 106-14) and the uptime the receipt port (e.g., port 106-21) may be derived from the hardware information included on the network device.

At block 583 the network device may determine the transmission port uptime is an amount of time that is greater than the transmit interval time. For example, the transmit interval time may be 5 seconds. The network device may determine that the transmission port uptime is greater than 5 seconds. At block 584 the network device may determine that the receipt port uptime is an amount of time that is greater than the transmit interval time. For example, the network device may determine that the transmission port uptime is also greater than 5 seconds. The network device may compare the port uptimes of the transmission and receipt ports to determine the port corresponding to the more recently configured link.

For example, at block 585 the network device may compare the port uptime of the transmission port to the port uptime of the receipt port. In this way, the network device may determine the port with the shorter uptime, thus the link corresponding to the port having the shorter uptime.

For example, at block 587, the network device may determine whether the transmission port has a greater uptime than the receipt port. If the network device determines that the uptime of the transmission port is greater than the uptime of the receipt port ("yes" at 588) then the network device may refrain from disabling the transmission port at block 590. For example, if the transmission port has an uptime of 10 seconds and the receipt port has an uptime of 7 seconds, the transmission port corresponds to the less recently configured link and may not be disabled as it was operational prior to the receipt port, thus is less likely to have created the network loop.

In contrast, the network device may determine that the transmission port does not have an uptime that is greater than the uptime of the receipt port ("no" at 589). For example, if the transmission port has an uptime of 7 seconds and the receipt port has an uptime of 10 seconds, the transmission port corresponds to the more recently configured link and may be disabled. In this example, the network device may disable the transmission port at block 591. The transmission port having a shorter uptime compared to the receipt port may indicate that the link corresponding to the transmission port is more recently configured and may be the cause of the network loop. The network device may disable the transmission port having the shorter port uptime as compared to the receipt port uptime (the comparison at block 585). In this way, the network device may remove a network loop and avoid network traffic disruption. In other examples, the receipt port may be disabled.

For example, at block 592, the network device may determine whether the receipt port has a greater uptime than the transmission port. If the network device determines that the uptime of the receipt port is greater than the uptime of the transmission port ("yes" at 593) then the network device may refrain from disabling the receipt port at block 595. For example, if the receipt port has an uptime of 10 seconds and the transmission port has an uptime of 7 seconds, the receipt port corresponds to the less recently configured link and may not be disabled as it was operational prior to the transmission port, thus is less likely to have created the network loop.

In contrast, the network device may determine that the receipt port does not have an uptime that is greater than the uptime of the transmission port ("no" at 594). For example, if the receipt port has an uptime of 7 seconds and the transmission port has an uptime of 10 seconds, the receipt port corresponds to the more recently configured link and may be disabled. In this example, the network device may disable the receipt port at block 596. The receipt port having a shorter uptime compared to the transmission port may indicate that the link corresponding to the receipt port is more recently configured and may be the cause of the network loop. The network device may disable the receipt port having the shorter port uptime as compared to the transmission port uptime (the comparison at block 585). In this way, the network device may remove a network loop and avoid network traffic disruption.

The above specification, examples and data provide a description of the method and applications and use of the system and method of the present disclosure. Since many examples can be made without departing from the spirit and scope of the system and method of the present disclosure, this specification merely sets forth some of the many possible example configurations and implementations.

What is claimed:

1. A network device, comprising:
    a plurality of ports;
    a processing resource; and
    a memory resource storing machine-readable instructions executable to cause the processing resource to:
        determine a transmit interval time indicating an amount of time when the network device transmits a layer 2 loop check packet from the plurality of ports to a different network device to probe for a network loop;

in response to detecting a network loop associated with a first and second ports, determine a first uptime of the first port and a second uptime of the second port, wherein an uptime of each of the plurality of ports indicates an amount of time that a particular port has been operating to transmit and receive the layer 2 loop check packet;

compare the first uptime and the second uptime with the transmit interval time; and in response to determining that the first uptime is less than the transmit interval time and that the second uptime is greater than the transmit interval time, disable the first port, thereby removing the detected network loop.

2. The network device of claim 1, the processing resource is further to:

determine third uptime of a third port of the plurality of ports;

compare the second uptime and the third uptime with the transmit interval time; and disable the third port in response to determining that the third uptime is less than the transmit interval time, thereby removing a second network loop.

3. The network device of claim 1, wherein a more recently configured link is disabled when the first port is disabled.

4. The network device of claim 1, the processing resource is further to:

determine that the second uptime of the second port is an amount of time that is less than the transmit interval time, and responsive to the determination, disable the second port.

5. The network device of claim 1, the processing resource is further to:

in response to determining that the first uptime and the second uptime are greater than the transmit interval time, compare the first uptime with the second uptime; and disable the second port, in response to determining that the second uptime is shorter than the first uptime.

6. The network device of claim 1, the processing resource is further to:

transmit a signal to warn a management controller of the determined existence of the network loop, based on the first port having been disabled.

7. The network device of claim 1, wherein the layer 2 loop check packet is a multicast packet, and wherein, when the layer 2 loop check packet is received by the different network device, it is forwarded to any device connected to the different network device.

8. The network device of claim 1, wherein the plurality of ports of the network device continue to transmit network packets to the different network device after the first port has been disabled.

9. The network device of claim 1, the processing resource is further to:

continually transmit the layer 2 loop check packet to a plurality of devices connected to the network device via the plurality of ports, wherein the layer 2 loop check packet is transmitted during the transmit interval time.

10. The network device of claim 1, wherein at least one of the first uptime of the first port and the second uptime of the second port is longer than the transmit interval time.

11. A loop detection system, comprising:

a first switch having a plurality of ports;

the first switch to:

transmit a layer 2 loop check packet during a transmit interval time, wherein the transmit interval time indicates an amount of time when the first switch transmits the layer 2 loop check packet from a first port of the first switch to a second switch via a first link to probe for a network loop;

the second switch to:

retransmit the layer 2 loop check packet to the first switch via a second link between the second switch and a second port of the first switch;

the first switch to:

in response to detecting a network loop associated with the first and second ports based on receiving the retransmitted layer 2 loop check packet, determine a first uptime of the first port and a second uptime of the second port;

compare the first uptime and the second uptime with the transmit interval time; and time;

in response to determining that the first uptime is greater than the transmit interval time and that the second uptime is less than the transmit interval time, disable the second port thereby removing the detected network loop.

12. The loop detection system of claim 11, wherein the layer 2 loop check packet is a multicast packet and wherein the layer 2 loop check packet is forwarded by the second switch to a network device connected to the second switch.

13. The loop detection system of claim 11, wherein information included in the retransmitted layer 2 loop check packet comprises a destination media access control (MAC) address and a source MAC address.

14. The loop detection system of claim 11, wherein the first switch is further to:

refrain from disabling the first port of the plurality of ports when the first uptime of the first port is greater than the transmit interval time, based on the comparison of the first uptime to the transmit interval time.

15. The loop detection system of claim 11, further comprising:

a first plurality of network devices connected to the first switch to utilize the first link to transmit packets to a second plurality of devices connected to the second switch, wherein the first link is a Link Aggregation Group (LAG) and wherein the LAG continues to operate after the second link is disabled.

16. The loop detection system of claim 11, wherein responsive to the disablement of the second port, the first switch is to transmit a signal to warn a management controller of the detected network loop.

17. A non-transitory machine-readable medium storing instructions that, when executed by a processing resource, cause the processing resource to:

determine a transmit interval time indicating an amount of time when a switch transmits a layer 2 loop check packet from a first plurality of ports to a second plurality of ports to probe for a network loop;

in response to detecting a network loop associated with a receipt port and a transmission port included on the switch, determine a first uptime of the receipt port and a second uptime of the transmission port, wherein an uptime of each of the first plurality of ports indicates an amount of time that a particular port has been operating to transmit and receive the layer 2 loop check packet;

compare the first uptime and the second uptime with the transmit interval time; and in response to determining that the first uptime is less than the transmit interval time and that the second uptime is greater than the transmit interval time, disable the receipt port, thereby removing the detected network loop.

18. The medium of claim 17, wherein a first link between the first plurality of ports included on the switch and the second plurality of ports included on a different switch connects multiple devices utilizing a Link Aggregation Group (LAG) link, and wherein the LAG link continues to operate responsive to the receipt port having been disabled.

19. The medium of claim 18, wherein a second link between the second plurality of ports and the receipt port is disabled when the receipt port is disabled.

20. The medium of claim 17, wherein the processing resource is to:
  refrain from disabling the transmission port when the second uptime of the transmission port is greater than the transmit interval time.

\* \* \* \* \*